United States Patent
Watanabe et al.

(10) Patent No.: US 10,988,181 B2
(45) Date of Patent: Apr. 27, 2021

(54) STRUCTURE FOR VEHICLE

(71) Applicant: KOBE STEEL, LTD., Hyogo (JP)

(72) Inventors: Kenichi Watanabe, Kobe (JP); Hideto Katsuma, Kobe (JP); Liang Chen, Fujisawa (JP)

(73) Assignee: KOBE STEEL, LTD., Hyogo (JP)

( * ) Notice: Subject to any disclaimer, the term of this patent is extended or adjusted under 35 U.S.C. 154(b) by 157 days.

(21) Appl. No.: 16/328,659

(22) PCT Filed: Sep. 5, 2017

(86) PCT No.: PCT/JP2017/031928
§ 371 (c)(1),
(2) Date: Feb. 26, 2019

(87) PCT Pub. No.: WO2018/061654
PCT Pub. Date: Apr. 5, 2018

(65) Prior Publication Data
US 2020/0269924 A1   Aug. 27, 2020

(30) Foreign Application Priority Data

Sep. 28, 2016 (JP) .............................. JP2016-190067
Nov. 29, 2016 (JP) .............................. JP2016-231136

(51) Int. Cl.
*B62D 25/02* (2006.01)
*B62D 27/02* (2006.01)

(52) U.S. Cl.
CPC ........... *B62D 25/025* (2013.01); *B62D 27/02* (2013.01)

(58) Field of Classification Search
CPC ..... B62D 25/025; B62D 27/02; B62D 21/157
(Continued)

(56) References Cited

U.S. PATENT DOCUMENTS 5,287,814 A * 2/1994 Masai .................... B61D 17/04
                                                                105/422
2010/0098969 A1* 4/2010 Hashimura ............ B21J 15/025
                                                                428/653
(Continued)

FOREIGN PATENT DOCUMENTS

EP          2128004 A1    12/2009
JP       H07-117727 A      5/1995
(Continued)

OTHER PUBLICATIONS

Notification of Transmittal of Translation of the International Preliminary Report on Patentability and Translation of Written Opinion of the International Searching Authority; PCT/JP2017/031928; dated Apr. 11, 2019.

(Continued)

*Primary Examiner* — Jason S Morrow
(74) *Attorney, Agent, or Firm* — Studebaker & Brackett PC

(57) ABSTRACT

A structure for a vehicle, includes: one side structure made of steel and located on one of outer and inner sides of a vehicle body; and another side structure located on the other of the outer and inner sides of the vehicle body and joined to the one side structure. The another side structure includes: a top portion made of an aluminum alloy and protruding toward the other side; wall portions respectively extending from both end parts of the top portion to the one side, each wall portion being made of an aluminum alloy; and a tab portion attached to an end part of the wall portion, extending toward an outside of the another side structure, and joined to the one side structure, the tab portion being made of steel.

7 Claims, 12 Drawing Sheets

(58) Field of Classification Search
USPC .......................................................... 296/209
See application file for complete search history.

(56) References Cited

U.S. PATENT DOCUMENTS

| | | | | |
|---|---|---|---|---|
| 2010/0109385 A1* | 5/2010 | Yamada | ............... | B62D 29/008 |
| | | | | 296/209 |
| 2014/0294489 A1* | 10/2014 | Sakai | .................... | B23K 11/20 |
| | | | | 403/267 |
| 2015/0145288 A1* | 5/2015 | Kellner | ............... | B62D 25/025 |
| | | | | 296/209 |
| 2018/0222530 A1* | 8/2018 | Hofer | .................... | B62D 65/02 |
| 2019/0344834 A1* | 11/2019 | Dagstrom | .............. | B62D 27/02 |

FOREIGN PATENT DOCUMENTS

| | | |
|---|---|---|
| JP | 2006-248461 A | 9/2006 |
| JP | 2006-264476 A | 10/2006 |
| JP | 2008-240969 A | 10/2008 |
| JP | 2012-214112 A | 11/2012 |

OTHER PUBLICATIONS

The extended European search report issued by the European Patent Office dated Apr. 23, 2020, which corresponds to European Patent Application No. 17855612.2-1009 and is related to U.S. Appl. No. 16/328,659.
International Search Report issued in PCT/JP2017/031928; dated Oct. 10, 2017.

* cited by examiner

STRUCTURE FOR VEHICLE

CROSS-REFERENCE TO RELATED APPLICATIONS

This is a national phase application in the United States of International Patent Application No. PCT/JP2017/031928 with an international filing date of Sep. 5, 2017, which claims priority of Japanese Patent Application No. 2016-190067 filed on Sep. 28, 2016 and Japanese Patent Application No. 2016-231136 filed on Nov. 29, 2016. The contents of these applications are incorporated herein by reference.

TECHNICAL FIELD

The present invention relates to a structure for a vehicle which is used especially in automobiles and includes one side structure located on one of outer and inner sides of a vehicle body and another side structure located on the other of the outer and inner sides of the vehicle body and joined to the one side structure.

BACKGROUND ART

As is well known, many structures used in automobiles have been recently required to have a shock energy absorption property against collision of vehicle bodies, as well as stiffness and strength, which are basic properties.

JP 2006-248461 A discloses a structure for an automobile designed as a structure with excellent shock energy absorption property and in which an aluminum alloy hollow member for reinforcement is disposed between a steel outer structure and a steel inner structure.

DISCLOSURE OF THE INVENTION

Problems to be Solved by the Invention

In order to achieve a further reduction in weight of the structure and to additionally improve the shock energy absorption property of the structure, it is proposed to use an aluminum alloy for the outer structure. In this case, the aluminum alloy outer structure and the steel inner structure, which are made of different materials, need to be joined together. However, a conventional vehicle body assembly line is configured to join the steel outer structure and the steel inner structure by welding. Therefore, if such joining of different materials is intended to be performed on the conventional vehicle body assembly line, significant line modification and capital investment become essential.

Accordingly, it is an object of the present invention to provide a structure for a vehicle which can join one side structure located on one of outer and inner sides of a vehicle body, with another side structure located on the other of the outer and inner sides of the vehicle body on a conventional vehicle body assembly line, while using an aluminum alloy in most of the another side structure.

Means for Solving the Problems

According to one aspect of the present invention, a structure for a vehicle comprises: one side structure made of steel and located on one of outer and inner sides of a vehicle body; and another side structure located on the other of the outer and inner sides of the vehicle body and joined to the one side structure, wherein the another side structure comprises: a top portion made of an aluminum alloy and protruding toward the other side;

wall portions respectively extending from both end parts of the top portion to the one side, each of the wall portions being made of an aluminum alloy; and a tab portion attached to an end part of the wall portion, extending toward an outside of the another side structure, and joined to the one side structure, the tab portion being made of steel.

With the above-mentioned configuration, the joining between the another side structure and the one side structure can be achieved by joining between the tab portion made of steel and the one side structure made of steel. Thus, the structure for a vehicle can be provided which enables the joining between the one side structure and the another side structure on a conventional vehicle body assembly line, while using an aluminum alloy in most of the another side structure.

The above-mentioned aspect preferably further includes the following configurations.

(1) The tab portion has one end part thereof attached to the end part of the wall portion, extends from the one end part to a bent portion thereof toward the one side, and then is bent at the bent portion toward the outside of the another side structure to lead to the other end part thereof.

The above-mentioned configuration (1) is the specific configuration of the tab portion. With this configuration, the tab portion that is capable of being easily joined with the one side structure can be provided.

(2) In a cross section perpendicular to a longitudinal direction of the another side structure, one or more closed spaces are formed in at least a part on the other side of the another side structure.

With the above-mentioned configuration (2), the shock absorption property of the another side structure can be improved by forming the closed space on the other side of the another side structure.

(3) In the above-mentioned configuration (2), at least one of the closed spaces extends toward the one side, and an end surface on the one side of the one closed space is adjacent to the one side structure.

With the above-mentioned configuration (3), the closed space can be formed in the another side structure so as to extend from another end surface of the another side structure on the other side to the end surface thereof on the one side that is adjacent to the one side structure, thereby making it possible to improve the shock absorption property of the another side structure. A bulk head, which is provided between the one side structure and the another side structure, can be omitted, and thus the skeleton of the whole structure can be simplified and its weight can be reduced.

(4) The tab portion is made of a high-strength steel plate, and a tensile strength of the high-strength steel plate is 590 MPa or more.

With the above-mentioned configuration (4), even when any reinforcing material is conventionally needed for reinforcement against collision, the reinforcing material can be eliminated by improving the strength of the tab portion to reach a predetermined level or higher. As a result, the skeleton of the another side structure can be simplified, and its weight can be reduced.

(5) A first concave portion recessed inward is formed in the end part of the wall portion, and the tab portion is attached to the first concave portion.

With the above-mentioned configuration (5), when an external force is input from the outside of the vehicle body, the external force can be efficiently transferred from the wall portion to the inner structure via the tab portion, thereby making it possible to prevent breakage of a joint portion between the tab portion and the wall portion due to the external force.

(6) In the above-mentioned configuration (5), the tab portion has one end part thereof attached to the end part of the wall portion, extends from the one end part to a bent portion thereof toward the one side, and then is bent at the bent portion toward the outer side of the another side structure to lead to the other end part thereof, and a second concave portion surrounding the bent portion of the tab portion from the inner side is formed in the end part of the wall portion.

With the above-mentioned configuration (6), when an external force is input from the outside of the vehicle body, since the second concave portion is formed so as to surround the bent portion of the tab portion from the inner side, the bent portion is held by the concave portion, thereby making it possible to prevent breakage of the joint portion between the tab portion and the wall portion due to the external force.

(7) Each of the top portion and the wall portion is made of an extruded material of the aluminum alloy, and a thickness of at least a part of the top portion and the wall portion is greater than a thickness of each of other parts thereof.

With the above-mentioned configuration (7), since each of the top portion and the wall portion is made of the extruded material of the aluminum alloy, a portion of the structure that requires reinforcement against collision can be reinforced by increasing its thickness without adding any reinforcing material.

Effects of the Invention

According to the present invention, the structure for a vehicle can be provided which joints one side structure and the another side structure on a conventional vehicle body assembly line, while using an aluminum alloy in most of the another side structure.

MODE FOR CARRYING OUT THE INVENTION

Figure 1:
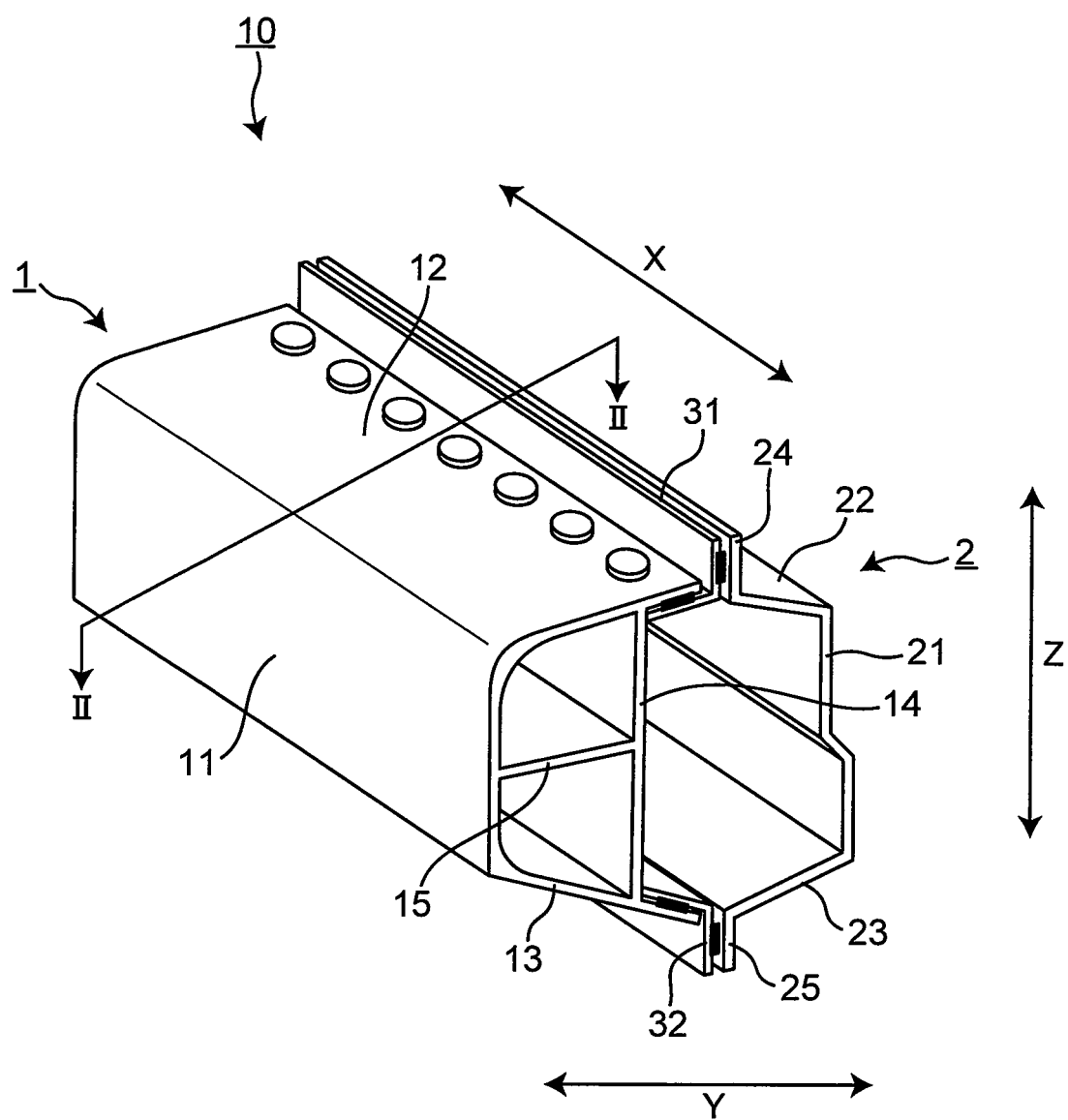
FIG. 1 is a perspective view of a structure for a vehicle according to an embodiment of the present invention.
Figure 2:
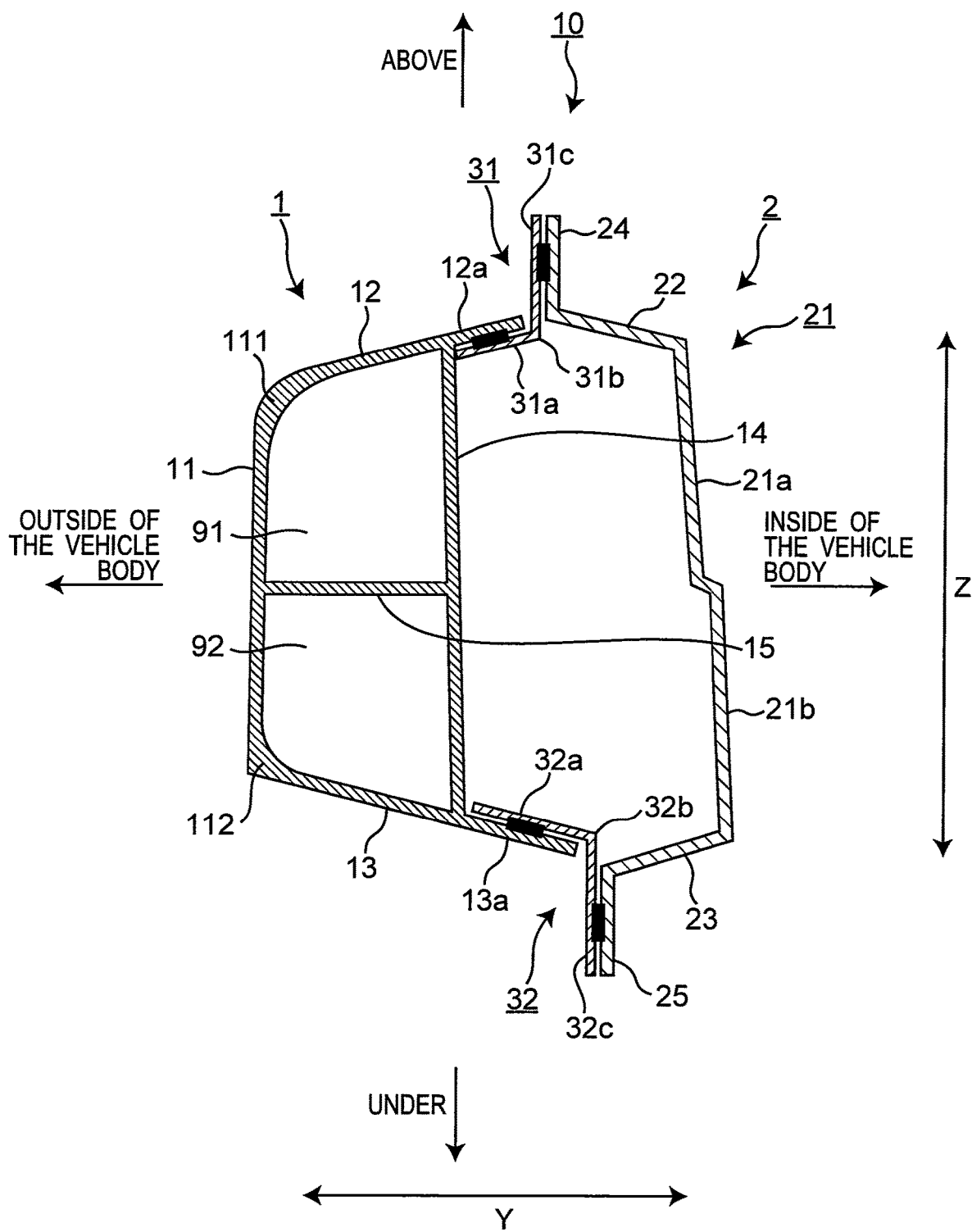
FIG. 2 is a cross-sectional view taken along the line II-II of FIG. 1.

FIG. 1 is a perspective view of a structure for a vehicle, namely, a vehicle structure 10 according to an embodiment of the present invention; and FIG. 2 is a cross-sectional view taken along the line II-II on a surface perpendicular to the longitudinal direction X in FIG. 1. In the present embodiment, the vehicle structure 10 is a rocker (side sill), in which the longitudinal direction X corresponds to the front-rear direction of a vehicle body, the Y direction corresponds to the vehicle width direction, and the Z direction corresponds to the vertical direction.

As shown in FIGS. 1 and 2, the vehicle structure 10 includes another side structure 1 (hereinafter referred to as an outer structure 1) located on the other side of the vehicle body (hereinafter referred to as an outer side of the vehicle body), and one side structure 2 (hereinafter referred to as an inner structure 2) located on one side of the vehicle body (hereinafter referred to as an inner side of the vehicle body). The outer structure 1 has a hollow shape in its cross-sectional view.

The outer structure 1 includes a top portion 11 protruding to the outer side of the vehicle body and extending substantially in the vertical direction, and a first wall portion 12 and a second wall portion 13 which respectively extend from both end parts in the vertical direction of the top portion 11 to the inner side of the vehicle body. The outer structure 1 further includes a first rib portion 14 connecting the first wall portion 12 and the second wall portion 13 and extending substantially in the vertical direction, and a second rib portion 15 connecting the top portion 11 and the first rib portion 14 and extending in the vehicle width direction. The top portion 11, the first wall portion 12, the second wall portion 13, the first rib portion 14, and the second rib portion 15 are integrally formed and made of an extruded material of an aluminum alloy. The tensile strength of the aluminum alloy is 300 MPa or more.

The first wall portion 12 extends toward the inner side of the vehicle body so as to be inclined to the outer side (upper side) of the outer structure 1, and the second wall portion 13 extends toward the inner side of the vehicle body so as to be inclined to the outer side (lower side) of the outer structure 1. The second rib portion 15 extends substantially in the horizontal direction toward the inner side of the vehicle body.

The top portion 11, the first wall portion 12, the second wall portion 13, the first rib portion 14, and the second rib portion 15 form hollow shapes that constitute a closed space 91 and a closed space 92 on the outer side of the vehicle body. Specifically, the closed space 91 is surrounded by the top portion 11, the first wall portion 12, the first rib portion 14, and the second rib portion 15. The closed space 92 is surrounded by the top portion 11, the second wall portion 13, the first rib portion 14, and the second rib portion 15.

The outer structure 1 further includes a first tab portion 31 that is attached to an inner surface (lower surface) of an end part 12a of the first wall portion 12, extends toward the outside (upward) of the outer structure 1, and is joined to the inner structure 2. The end part 12a is located at the end part of the first wall portion 12 on the inner side of the vehicle body and which does not form the closed space 91. It is noted that the first tab portion 31 may be attached to an outer surface (upper surface) of the end part 12*a* of the first wall portion 12.

The thickness of at least a part of the top portion 11, the first wall portion 12, and the second wall portion 13 is greater than the thickness of each of other parts thereof. For example, in the present embodiment, each of the thickness of a connecting portion 111 between the top portion 11 and the first wall portion 12 and the thickness of a connecting portion 112 between the top portion 11 and the second wall portion 13 is greater than the thickness of each of other parts thereof.

The outer structure 1 further includes a second tab portion 32 that is attached to an inner surface (upper surface) of an end part 13*a* of the second wall portion 13, extends toward the outside (downward) of the outer structure 1, and is joined to the inner structure 2. The end part 13*a* is located at an end part of the second wall portion 13 on the inner side of the vehicle body and which does not form the closed space 92. It is noted that the second tab portion 32 may be attached to an outer surface (lower surface) of the end part 13*a* of the second wall portion 13.

The first tab portion 31 and the second tab portion 32 each are made of a high-strength steel plate. The tensile strength of the high-strength steel plate is 590 MPa or more. It is noted that the first tab portion 31 and the second tab portion 32 are preferably formed using a thin plate of ultra-high tensile strength steel that has a tensile strength of 980 MPa or more.

The first tab portion 31 has one end part 31*a* attached to the end part 12*a* of the first wall portion 12. The first tab portion 31 extends from the one end part 31*a* to a bent portion 31*b* toward the inner side of the vehicle body and then is bent at the bent portion 31*b* toward the outer side (upper side) of the outer structure 1 to lead from the bent portion 31*b* to another end part 31*c*. The first tab portion 31 has a substantially L-like shape.

The second tab portion 32 has one end part 32*a* attached to the end part 13*a* of the second wall portion 13. The second tab portion 32 extends from the one end part 32*a* to a bent portion 32*b* toward the inner side of the vehicle body and then is bent at the bent portion 32*b* toward the outer side (lower side) of the outer structure 1 to lead from the bent portion 32*b* to another end part 32*c*. The second tab portion 32 has a substantially L-like shape.

The joining between the first wall portion 12 and the first tab portion 31 and the joining between the second wall portion 13 and the second tab portion 32 are joining using different materials, namely, an aluminum alloy and steel, and are achieved by joining with a well-known rivet or the like. Such joining with different materials is performed not on the vehicle body assembly line, but on a production line of the outer structure 1.

The inner structure 2 includes a top portion 21 protruding to the inner side of the vehicle body and extending substantially in the vertical direction, and a first wall portion 22 and a second wall portion 23 which respectively extend from both end parts in the vertical direction of the top portion 21 to the outer side of the vehicle body. The inner structure 2 further includes a first flange portion 24 extending from an end part of the first wall portion 22 toward the outer side (upper side) of the inner structure 2 and a second flange portion 25 extending from an end part of the second wall portion 23 toward the outer side (lower side) of the inner structure 2. The top portion 21, the first wall portion 22, the second wall portion 23, the first flange portion 24, and the second flange portion 25 are integrally formed from a plate material and made of a high-strength steel plate. The tensile strength of the high-strength steel plate is 590 MPa or more.

The top portion 21 may have a plurality of portions that protrude by different protruding amounts toward the inner side of the vehicle body. For example, in the present embodiment, the top portion 21 includes a first top portion 21*a* that protrudes toward the inner side of the vehicle body by a small protruding amount and a second top portion 21*b* that protrudes toward the inner side of the vehicle body by a larger protruding amount than the first top portion 21*a*. The second top portion 21*b* is formed under the first top portion 21*a*.

The first wall portion 22 is inclined to the outside (upward) of the inner structure 2 toward the outer side of the vehicle body, and the second wall portion 23 is inclined to the outside (downward) of the outer structure 1 toward the outer side of the vehicle body. Since the first flange portion 24 and the second flange portion 25 extend substantially in the vertical direction, each of the angle formed by the first wall portion 22 and the first flange portion 24 and the angle formed by the second wall portion 23 and the second flange portion 25 exceeds 90 degrees.

On the vehicle body assembly line, the first tab portion 31 made of steel in the outer structure 1 and the first flange portion 24 made of steel in the inner structure 2 are spot-welded, while the second tab portion 32 made of steel in the outer structure 1 and the second flange portion 25 made of steel in the inner structure 2 are spot-welded. Consequently, the outer structure 1 and the inner structure 2 are joined together to form the vehicle structure 10.

According to the outer structure 1 with the above-mentioned configuration, the following effects can be exhibited.

(1) The joining between the outer structure 1 and the inner structure 2 can be achieved by joining between the inner structure 2 made of steel and each of the first tab portion 31 and second tab portion 32 which are also made of steel. Thus, the outer structure 1 can be provided which enables the joining between the outer structure 1 and the inner structure 2 on the conventional vehicle body assembly line, while using an aluminum alloy in most of the outer structure 1.

(2) The first tab portion 31 has the one end part 31*a* attached to the end part 12*a* of the first wall portion 12. The first tab portion 31 extends from the one end part 31*a* to the bent portion 31*b* toward the inner side of the vehicle body and then is bent at the bent portion 31*b* toward the outside of the outer structure to lead to the other end part 31*c*. Likewise, the second tab portion 32 has the one end part 32*a* attached to the end part of the second wall portion 13. The second tab portion 32 extends from the one end part 32*a* to the bent portion 32*b* toward the inner side of the vehicle body and then is bent at the bent portion 32*b* toward the outside of the outer structure 1 to lead to the other end part 32*c*. Such a configuration of the first tab portion 31 and second tab portion 32 can provide the first tab portion 31 and the second tab portion 32 which are capable of being easily joined with the inner structure 2.

(3) In the cross section perpendicular to the longitudinal direction X of the outer structure 1, the closed spaces 91 and 92 are formed on the outer side of the vehicle body in the outer structure 1. Here, by forming the closed spaces 91 and 92 in the outer structure 1, the shock absorption property of the outer structure 1 can be improved. In particular, by forming the closed spaces 91 and 92 on the outer side of the vehicle body, the shock absorption property of the outer structure 1 can be further improved, as compared with the case where the closed space is formed on the inner side of the vehicle body.

(4) Each of the thickness of the connecting portion 111 between the top portion 11 and the first wall portion 12 and the thickness of the connecting portion 112 between the top portion 11 and the second wall portion 13 is greater than the thickness of each of other parts thereof. This configuration can be easily achieved by forming the top portion 11, the first wall portion 12, and the second wall portion 13 using an extruded material of an aluminum alloy. Consequently, a portion in the outer structure 1 that requires reinforcement against collision can be easily reinforced by increasing its thickness without adding any reinforcing material. It is noted that the top portion 11, the first wall portion 12, the second wall portion 13, the first rib portion 14, and the second rib portion 15 are integrally formed and made of an extruded material of an aluminum alloy. Therefore, the thickness of any desired portion including, but not limited to, the connection portion between the top portion 11 and the first wall portion 12 and the connection portion between the top portion 11 and the second wall portion 13, can be greater than the thickness of each of other parts thereof.

(5) The first tab portion 31 and the second tab portion 32 each are made of a high-strength steel plate, and the tensile strength of the high-strength steel plate is 590 MPa or more. For example, conventionally, in a case where the outer structure 1 is a side sill (rocker), the end part of the first wall portion 12 with the first tab portion 31 attached thereto and the end part of the second wall portion 13 with the second tab portion 32 attached thereto need to be provided with a reinforcing material for reinforcement against impact in the longitudinal direction X (impact upon collision at the front surface). Here, by improving the strength of the first tab portion 31 and the second tab portion 32, the reinforcing material can be eliminated. As a result, the skeleton of the outer structure 1 can be simplified and its weight can be reduced.

(Modification 1)

Figure 3A:
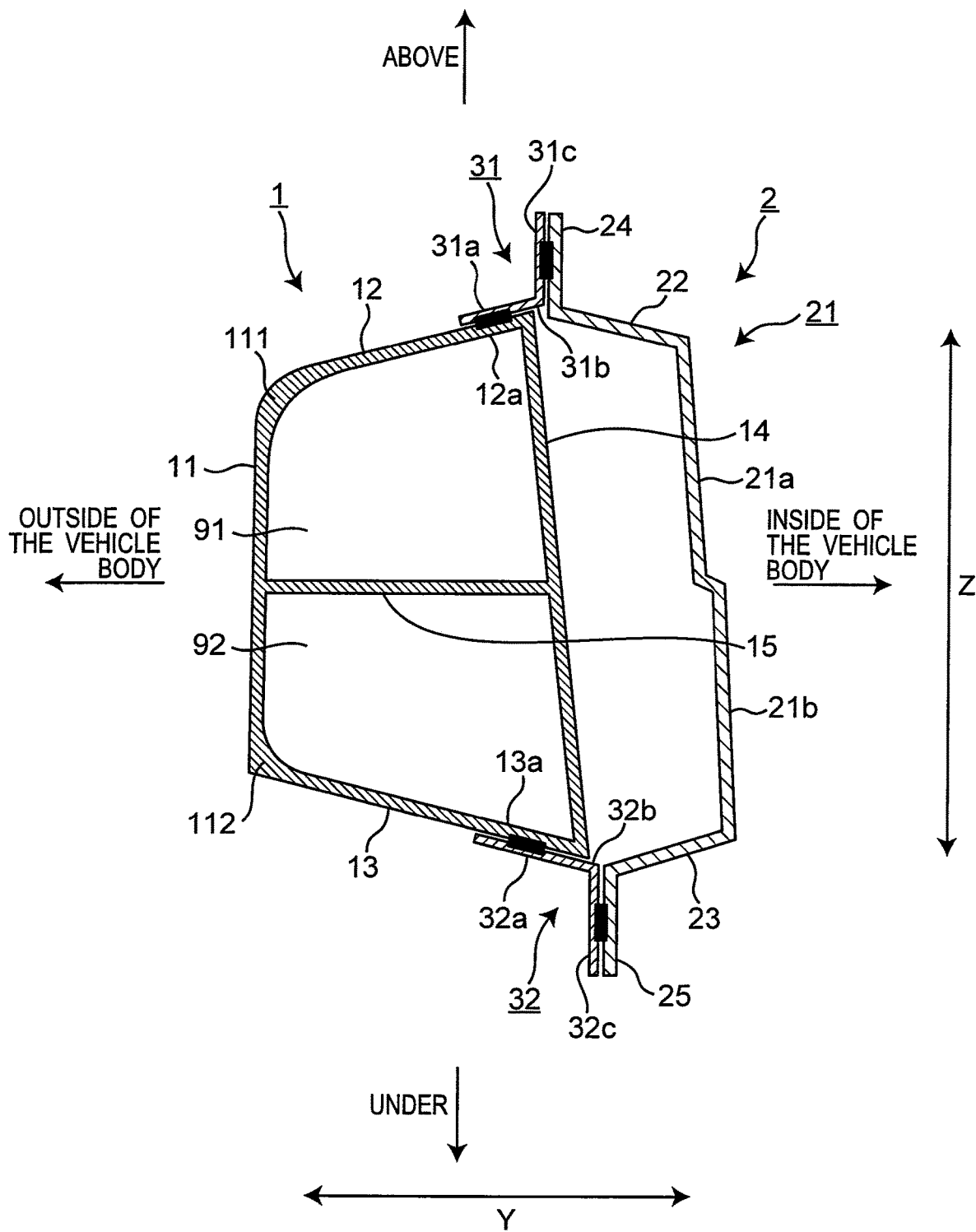
FIG. 3A is a vertical cross-sectional view in a case where an end part of a first wall portion and an end part of a second wall portion form a closed space.

Although in the above-mentioned embodiment, the end part of the first wall portion and the end part of the second wall portion do not form a closed space, the end part of the first wall portion and the end part of the second wall portion may form a closed space. FIG. 3A is a vertical cross-sectional view in a case where the end part of the first wall portion and the end part of the second wall portion form the closed space.

As shown in FIG. 3A, the first rib portion 14 connects the end part 12a of the first wall portion 12 and the end part 13a of the second wall portion 13, and extends substantially in the vertical direction. Consequently, the end part 12a of the first wall portion 12 forms the closed space 91, and the end part 13a of the second wall portion 13 forms the closed space 92. Therefore, the first tab portion 31 is attached to the outer surface (upper surface) of the end part 12a of the first wall portion 12, and the second tab portion 32 is attached to the outer surface (lower surface) of the end part 13a of the second wall portion 13.

With the above-mentioned configuration, the cross-sectional areas of the closed space 91 and the closed space 92 can be increased, as compared with the above-mentioned embodiment, thus making it possible to improve the shock absorption property of the outer structure 1.

The first tab portion 31 and the second tab portion 32 are formed by folding the respective extruded materials outward, and attached to the outer surface of the end part 12a of the first wall portion 12 and the outer surface of the end part 13 of the second wall portion 13, respectively. Thus, even when a force folding the outer structure 1 in the vertical direction is input via the other end parts 31c and 32c, the force can be compensated by the first rib portion 14, thus efficiently reinforcing the outer structure 1.

Figure 3B:
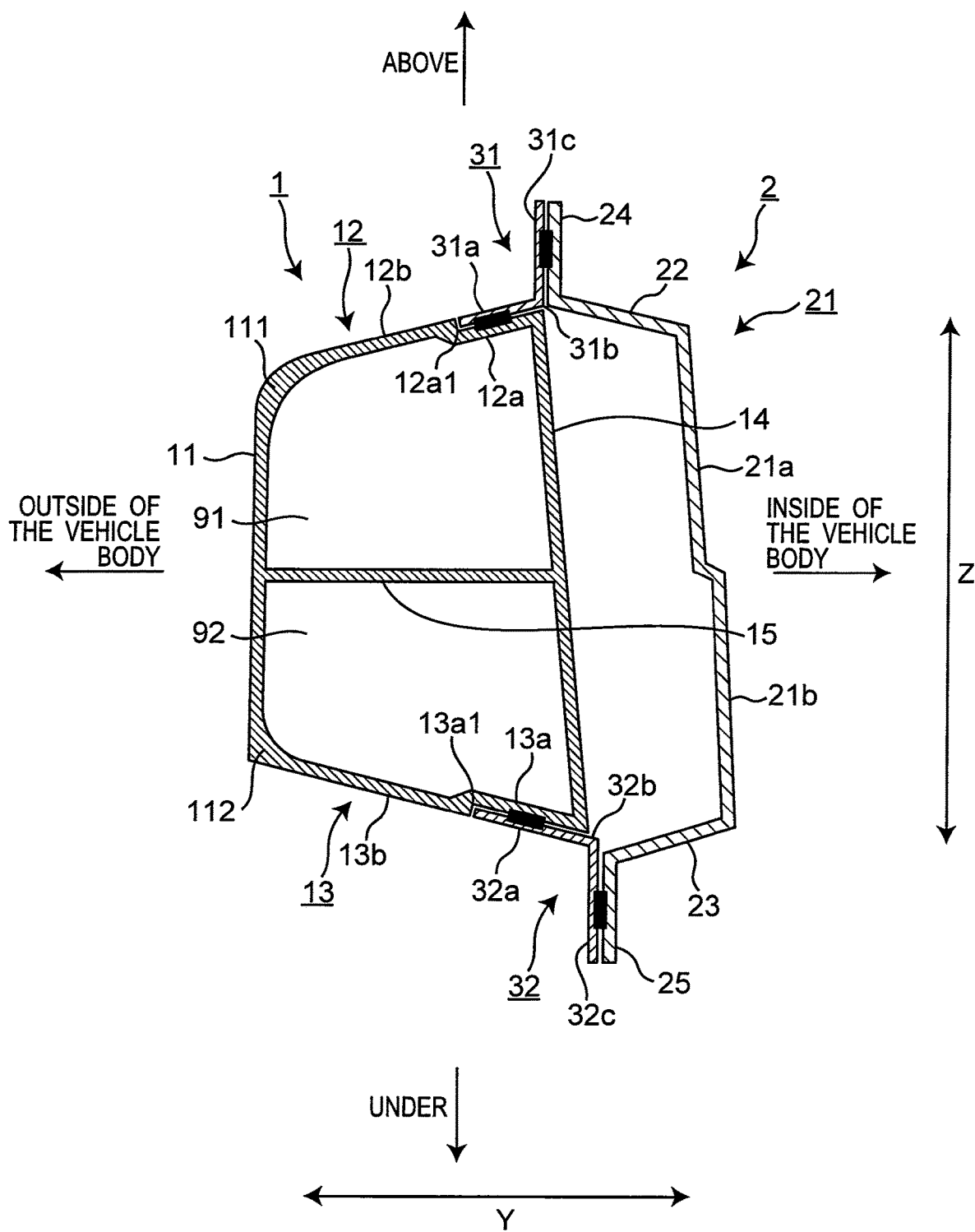
FIG. 3B is a vertical cross-sectional view showing a modification of an outer structure of FIG. 3A.

FIGS. 3B to 3H are vertical cross-sectional views showing modifications of the outer structure 1 of FIG. 3A. As shown in FIG. 3B, a concave portion 12a1 (first concave portion) is formed in the end part 12a of the first wall portion 12. The concave portion 12a1 is recessed inward at the end of the one end part 31a of the first tab portion 31. The first tab portion 31 is attached to the concave portion 12a1. A remaining part 12b of the first wall portion 12 is located in an extending direction of the one end part 31a. The end part of the one end part 31a abuts against the concave portion 12a1, so that the outer surface of the one end part 31a and the outer surface of the remaining part 12b of the first wall portion 12 are located on the same plane. Likewise, a concave portion 13a1 (first concave portion) is formed in the end part 13a of the second wall portion 13. The concave portion 13a1 is recessed inward at the end of the one end part 32a of the second tab portion 32. The second tab portion 32 is attached to the concave portion 13a1. A remaining part 13b of the second wall portion 13 is located in an extending direction of the one end part 32a. The end of the one end part 32a abuts against the concave portion 13a1, so that the outer surface of the one end part 32a and the outer surface of the remaining part 13b of the second wall portion 13 are located on the same plane.

With the above-mentioned configuration, when an external force is input from the outside of the vehicle body, the external force can be efficiently transferred from the first wall portion 12 and the second wall portion 13 to the inner structure 2 via the first tab portion 31 and the second tab portion 32, thereby making it possible to prevent breakage of a joint portion between the first tab portion 31 and the first wall portion 12 and a joint portion between the second tab portion 32 and the second wall portion 13 due to the external force. It is noted that the one end part 31a and the one end part 32a may be provided in respective locations that are recessed toward the inside of the vehicle body with respect to the outer surface of the remaining part 12b of the first wall portion 12 and the outer surface of the remaining part 13b of the second wall portion 13, respectively. In this case, when an external force is input from the outside of the vehicle body, the one end part 31a and the one end part 32a can be easily caught by the remaining part 12b of the first wall portion 12 and the remaining part 13b of the second wall portion 13, respectively.

Figure 3C:
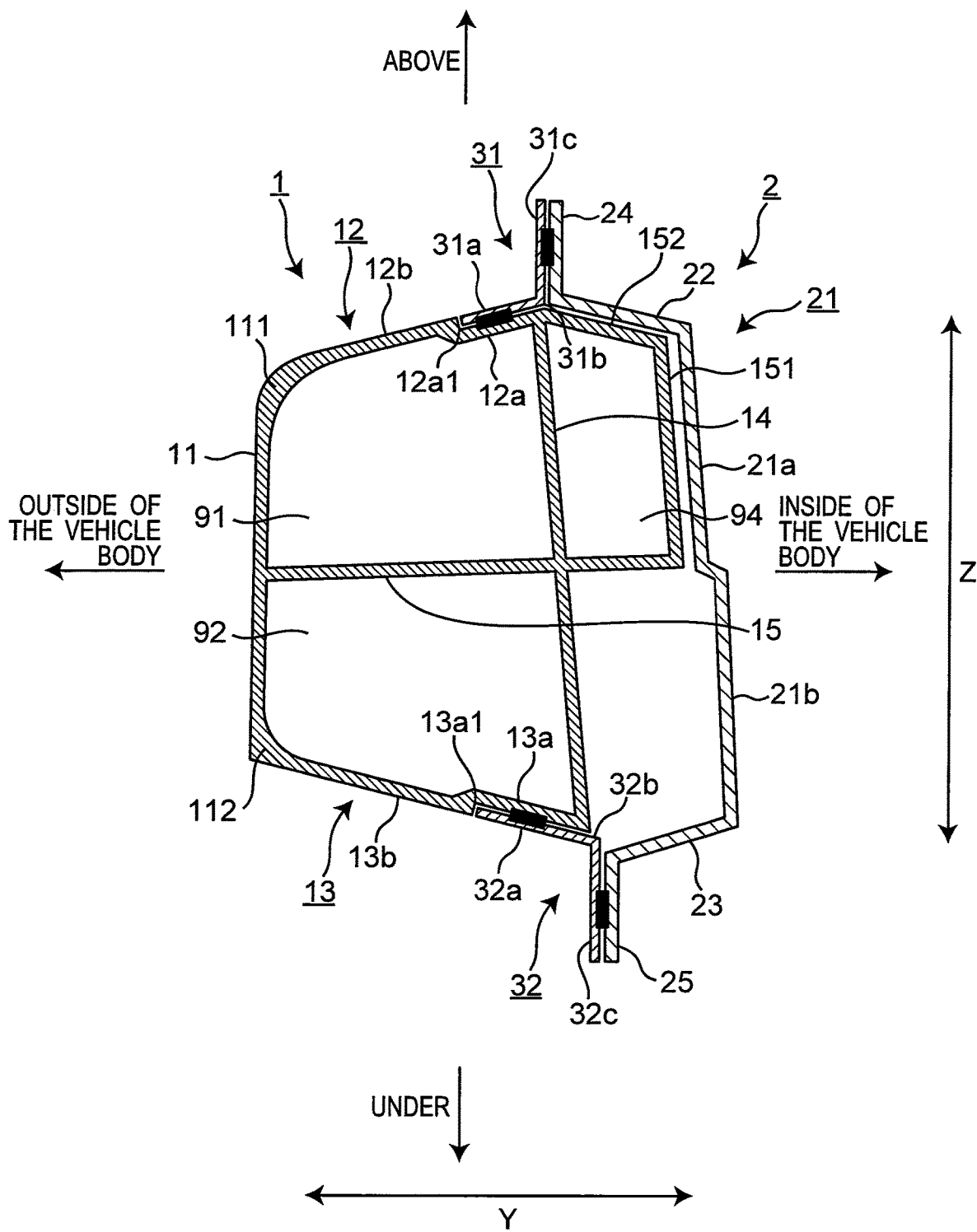
FIG. 3C is a vertical cross-sectional view showing another modification of the outer structure of FIG. 3A.

As shown in FIG. 3C, in addition to the configuration of FIG. 3B, rib portions 151 and 152 may be further provided so that the second rib portion 15 extends to the inner side of the vehicle body to form a closed space 94 on the inner side of the vehicle body with respect to the closed space 91. The rib portion 151 extends in the vertical direction along the first top portion 21a and is connected to an end part of the second rib portion 15 on the inner side of the vehicle body. The rib portion 152 extends in the vehicle width direction along the first wall portion 22 and connects an upper end part of the rib portion 151 and the end part 12a of the first wall portion 12. The closed space 94 is formed by the first rib portion 14, the second rib portion 15, and the rib portions 151 and 152, and is provided adjacent to an upper portion of the inner structure 2.

With the above-mentioned configuration, the closed space 94 is formed to be adjacent to the upper portion of the inner structure 2. Thus, when an external force is input from the outside of the vehicle body, the external force can be efficiently transferred to the inner structure 2. When an external force is input from the front of the vehicle body, the reinforcement of the vehicle structure can also be executed.

Figure 3D:
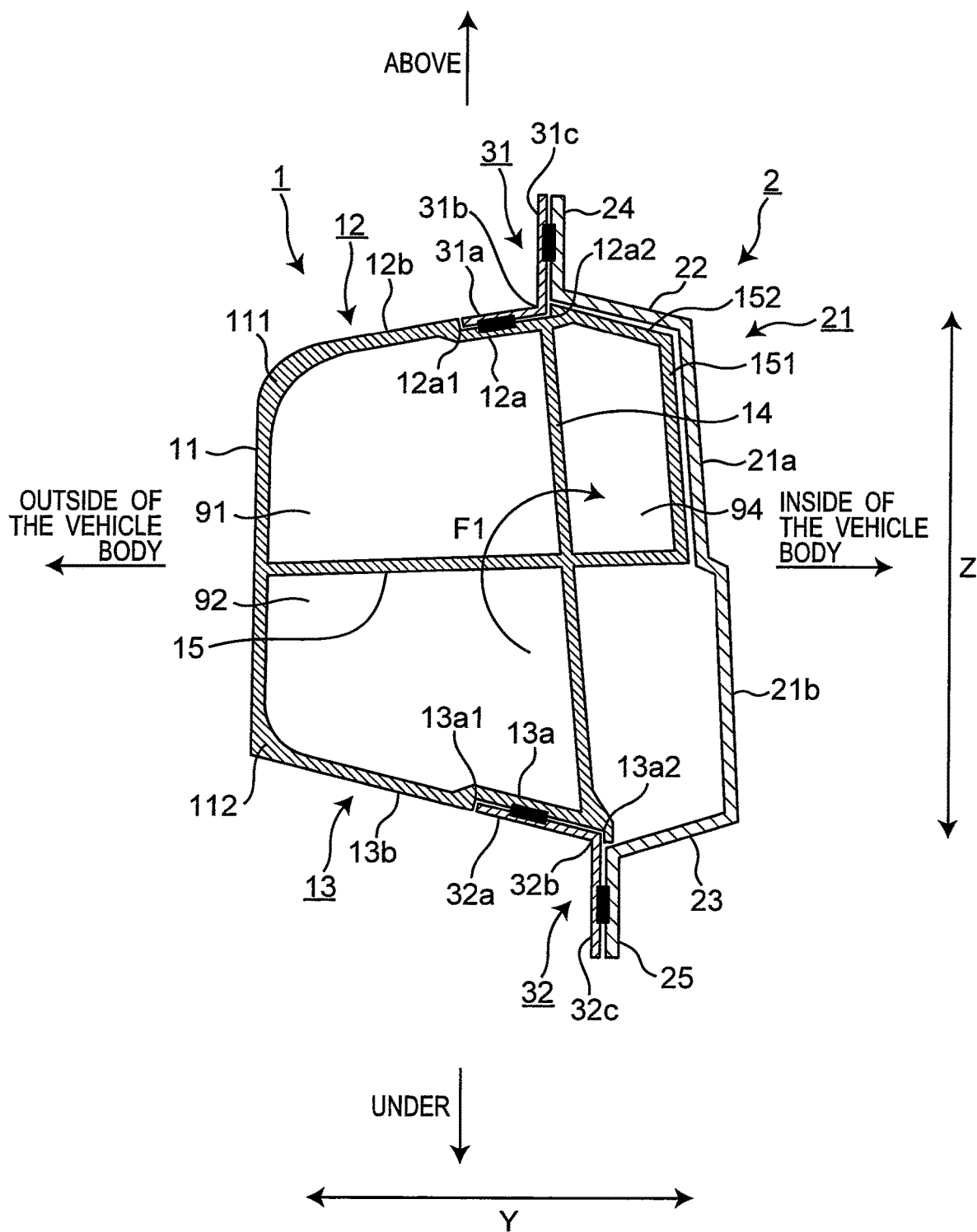
FIG. 3D is a vertical cross-sectional view showing another modification of the outer structure of FIG. 3A.

As shown in FIG. 3D, in addition to the configuration of FIG. 3C, a concave portion 12a2 (second concave portion) that surrounds the bent portion 31b of the first tab portion 31 from the inner side may be formed in the end part 12a of the first wall portion 12, whereas a concave portion 13a2 (second concave portion) that surrounds the bent portion 32b of the second tab portion 32 from the inner side may be formed in the end part 13a of the second wall portion 13.

If an external force is input from the outside of the vehicle body, it is considered that a torsional force F1 indicated by an arrow in FIG. 3D could be generated in the outer structure 1. However, with the above-mentioned configuration, the concave portions 12a2 and 13a2 are formed so as to surround the bent portion 31b of the first tab portion 31 and the bent portion 32b of the second tab portion 32 from the inner side, respectively. Thus, the bent portions 31b and 32b are held by the concave portions 12a2 and 13a2, respectively. This makes it possible to prevent breakage of the joint portion between the first tab portion 31 and the first wall portion 12 and the joint portion between the second tab portion 32 and the second wall portion 13 due to the torsional force F1 applied to the outer structure 1.

Figure 3E:
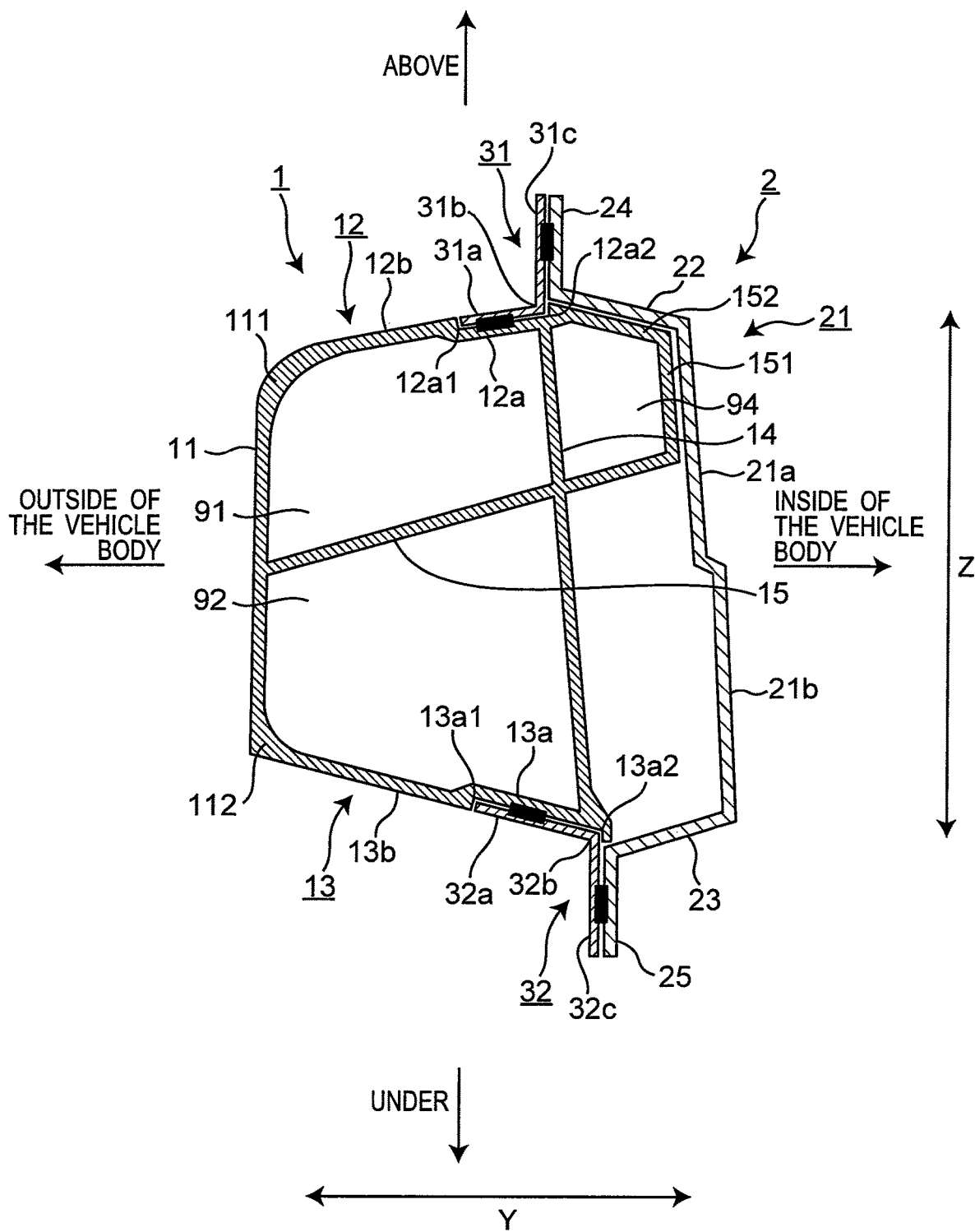
FIG. 3E is a vertical cross-sectional view showing another modification of the outer structure of FIG. 3A.

As shown in FIG. 3E, in addition to the configuration of FIG. 3D, the second rib portion 15 may extend so as to be inclined upward to the inner side of the vehicle body.

With the above-mentioned configuration, the closed space 94 can be made smaller, and as a result, the weight of the outer structure 1 can be reduced.

Figure 3F:
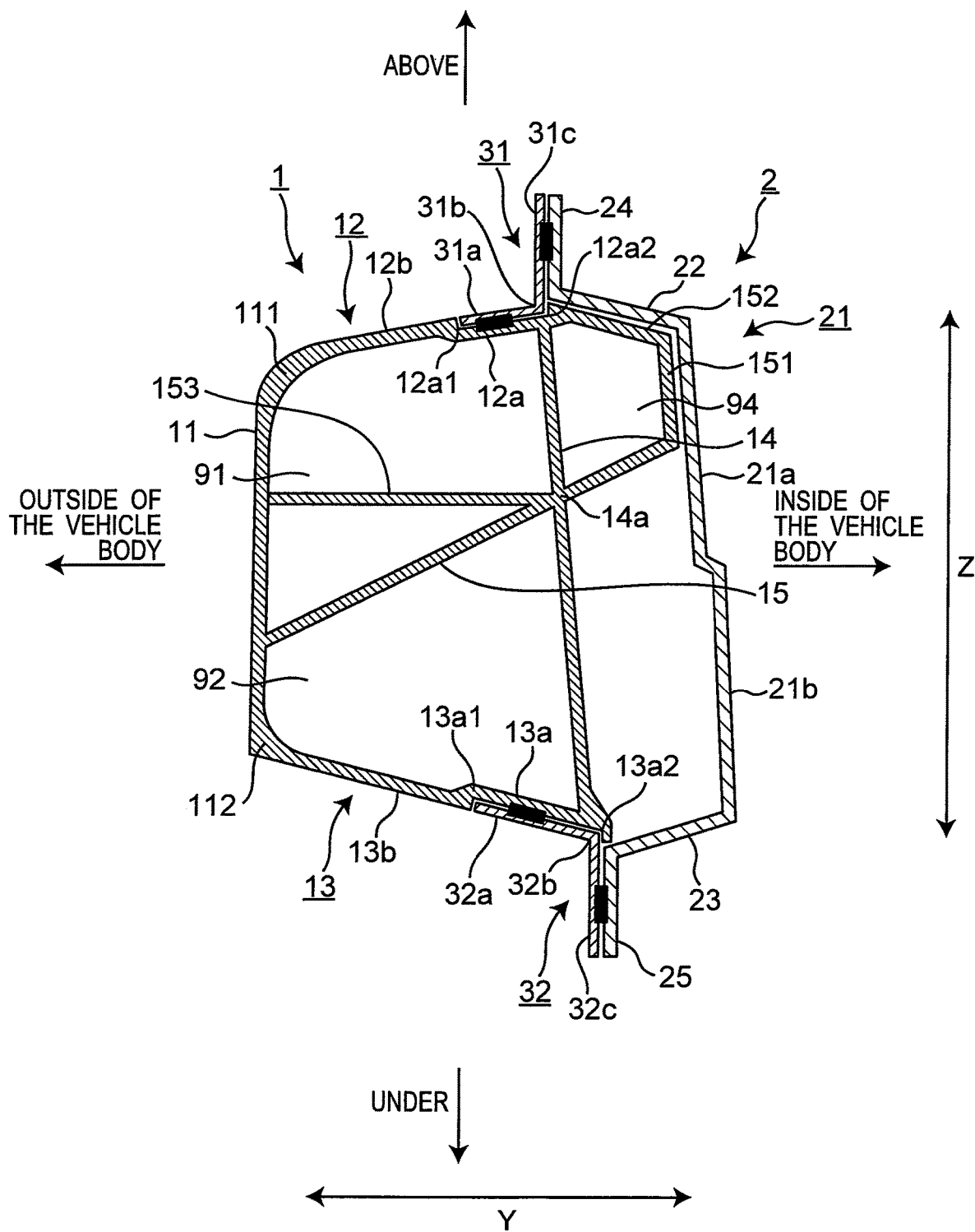
FIG. 3F is a vertical cross-sectional view showing another modification of the outer structure of FIG. 3A.

As shown in FIG. 3F, a rib portion 153 may be added to the configuration of FIG. 3E. The rib portion 153 extends in the vehicle width direction and connects the top portion 11 to a connection portion 14a between the first rib portion 14 and the second rib portion 15.

With the above-mentioned configuration, the skeleton of the outer structure 1 on the outer side of the vehicle body can be reinforced by the rib portion 153.

Figure 3G:
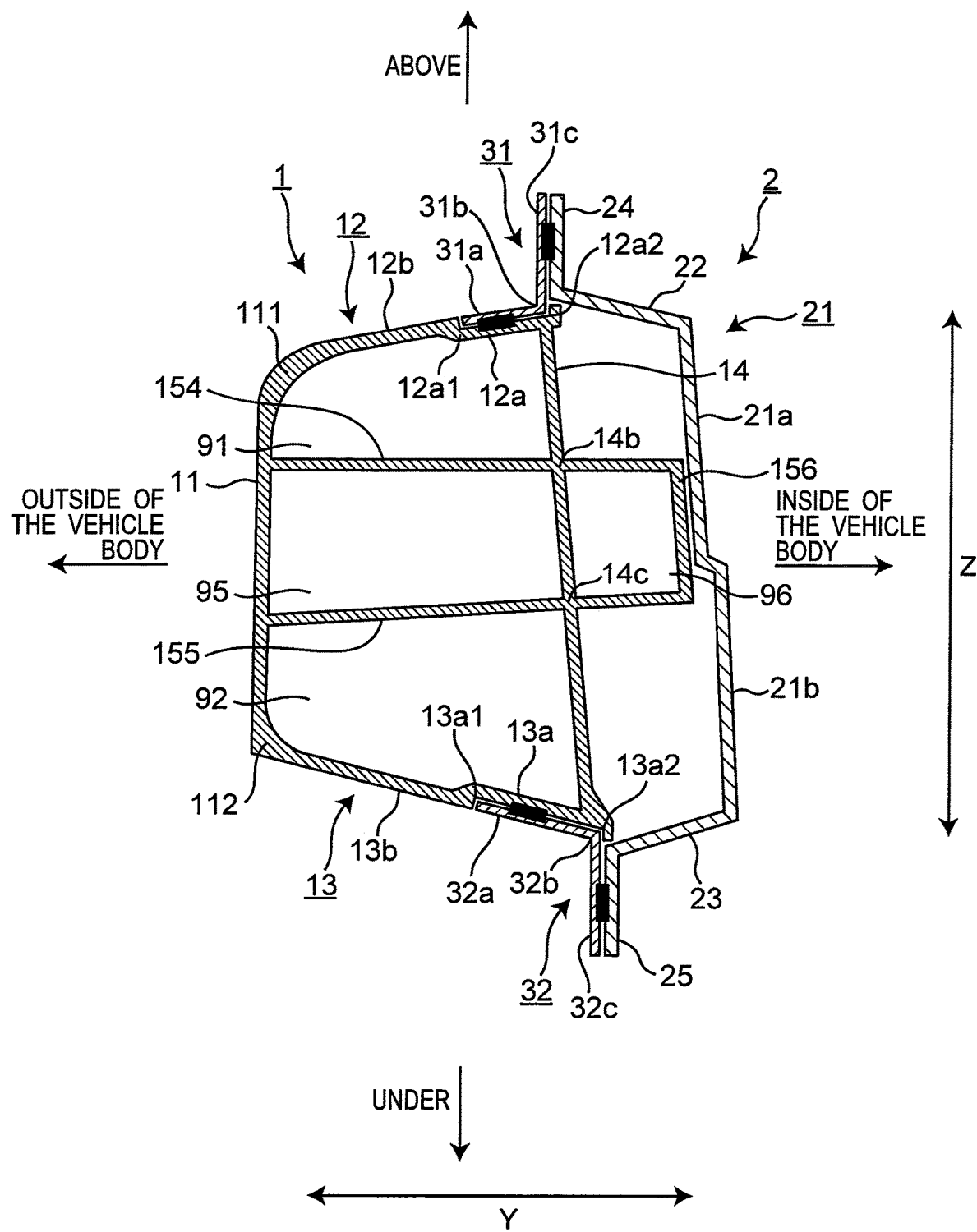
FIG. 3G is a vertical cross-sectional view showing another modification of the outer structure of FIG. 3A.

As shown in FIG. 3G, rib portions 154 and 155 extending in the vehicle width direction and a rib portion 156 connecting the rib portion 154 and the rib portion 155 and extending in the vertical direction along the inner structure 2 may be added to an intermediate portion in the vertical direction of the outer structure 1. The rib portion 154 connects the top portion 11 and the first rib portion 14. The rib portion 154 further extends from a connection portion 14b where it connects with the first rib portion 14, to the inner side in the vehicle width direction and is connected to the upper end part of the rib portion 156 while being adjacent to the inner structure 2. The rib portion 155 is located under the rib portion 154 and connects the top portion 11 and the first rib portion 14. The rib portion 155 further extends from the connection portion 14c where it connects the first rib portion 14, to the inner side in the vehicle width direction, and is connected to the lower end part of the rib portion 156 while being adjacent to the inner structure 2. A closed space 95 is formed by the top portion 11, the rib portions 154 and 155, and the first rib portion 14, and a closed space 96 is formed by the first rib portion 14, the rib portions 154 and 155, and the rib portion 156 on the inner side in the vehicle width direction with respect to the closed space 95.

With the above-mentioned configuration, by forming the closed spaces 95 and 96, the shock absorption property of the outer structure 1 against the external force applied from the outside in the vehicle width direction can be improved.

Figure 3H:
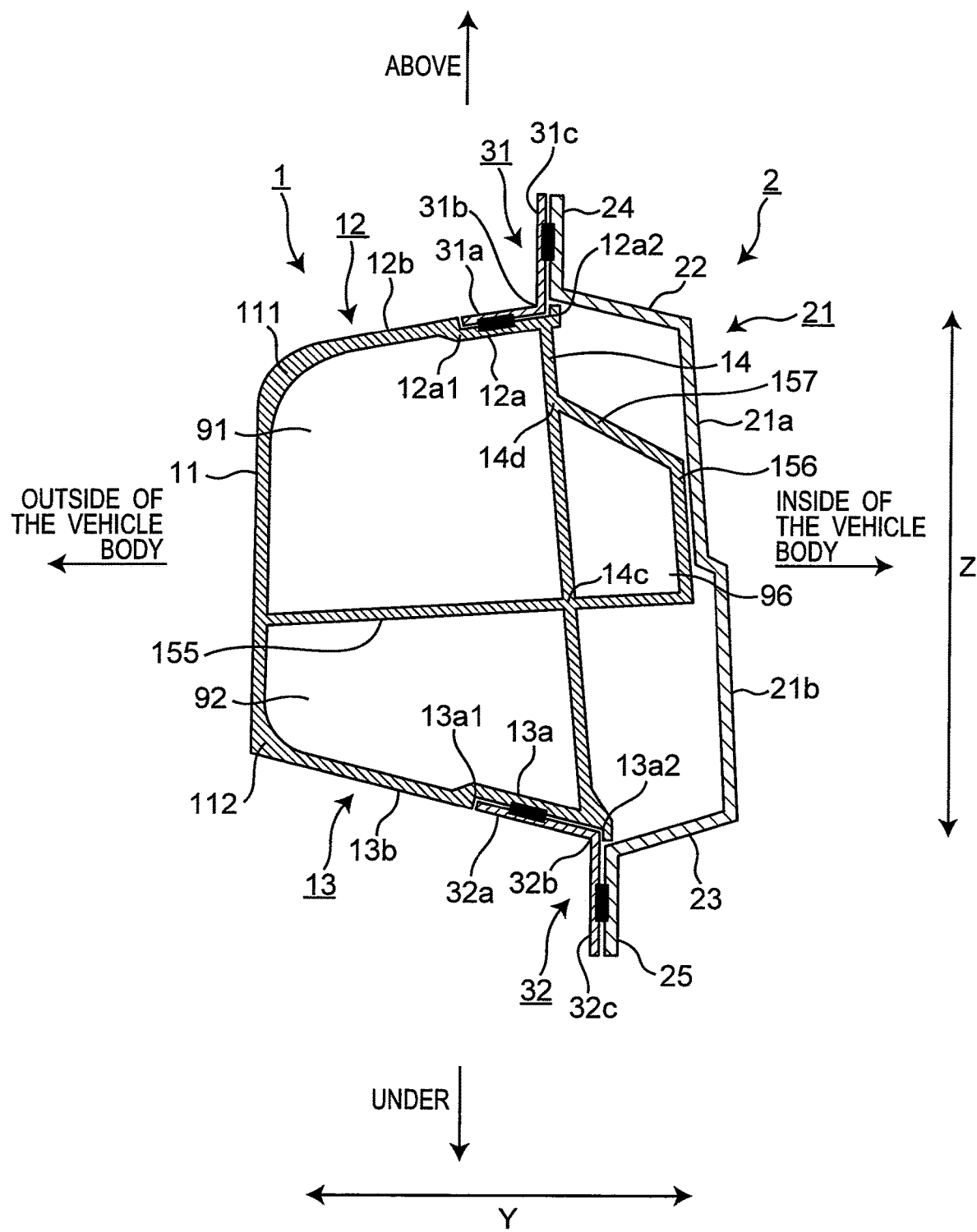
FIG. 3H is a vertical cross-sectional view showing another modification of the outer structure of FIG. 3A.

As shown in FIG. 3H, the rib portion 154 may be eliminated from, and a rib portion 157 may be added to the configuration shown in FIG. 3G. The rib portion 157 connects an upper end part of the rib portion 156 and the first rib portion 14. A connection portion 14d of the rib portion 157 with the first rib portion 14 is located above the connection portion 14b shown in FIG. 3G, and the rib portion 157 extends so as to be inclined downward from the connection portion 14d toward the inner side in the vehicle width direction.

With the above-mentioned configuration, by eliminating the rib portion 154, the weight of the outer structure 1 can be reduced. The closed space 96 can be enlarged, thereby making it possible to improve the shock absorption property of the outer structure 1 on the inner side of the vehicle body.

(Modification 2)

Figure 4:
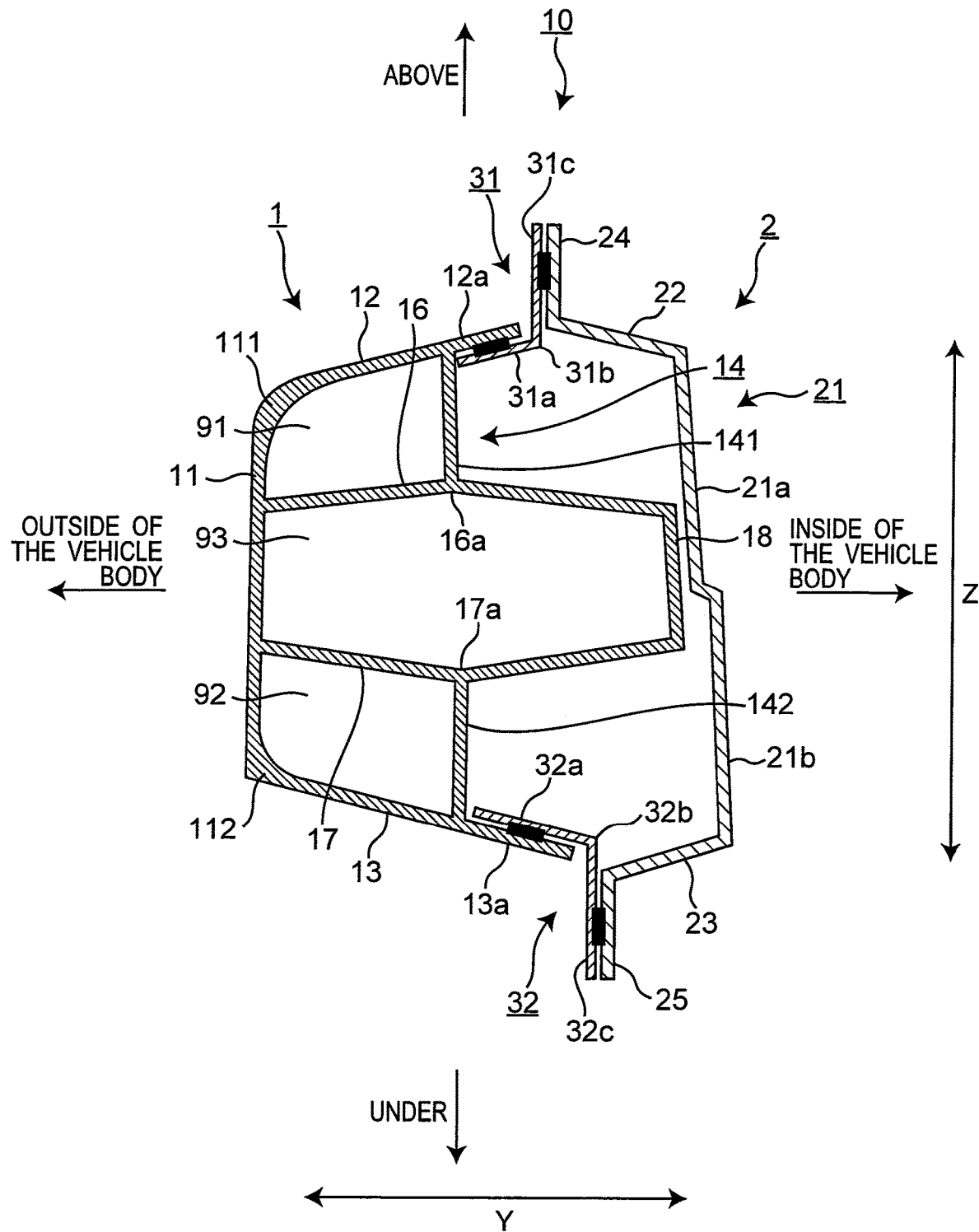
FIG. 4 is a vertical cross-sectional view in a case where an end surface of a closed space on the inner side of the vehicle body is adjacent to an inner structure.

In the above-mentioned embodiments, the closed space 91 and the closed space 92 are provided on the outer side of the vehicle body. Alternatively, a closed space may extend to the inner side of the vehicle body, while an end surface of the closed space on the inner side of the vehicle body may be disposed adjacent to the inner structure 2. FIG. 4 is a vertical cross-sectional view in a case where the end surface of the closed space 93 on the inner side of the vehicle body is adjacent to the inner structure 2.

As shown in FIG. 4, the first rib portion 14 extending in the vertical direction is divided into two portions, namely, a third rib portion 141 and a fourth rib portion 142, and thus a closed space 93 is formed between the two divided first rib portions 14 and between the closed space 91 and the closed space 92. The closed space 93 is formed by the top portion 11, and a fifth rib portion 16 and a sixth rib portion 17 both of which extend in the vehicle width direction, and a seventh rib portion 18 which extends in the vertical direction. The fifth rib portion 16 has its end on the outer side of the vehicle body connected to the top portion 11 and its end on the inner side of the vehicle body connected to the seventh rib portion 18. The fifth rib portion 16 is connected to the third rib portion 141 at a bent portion 16a of the intermediate portion in the vehicle width direction. The fifth rib portion 16 is inclined upward from the end on the outer side of the vehicle body toward the bent portion 16a and also inclined downward from the bent portion 16a toward the end on the inner side of the vehicle body.

The sixth rib portion 17 is located under the fifth rib portion 16 and has its end on the outer side of the vehicle body connected to the top portion 11 and its end on the inner side of the vehicle body connected to the seventh rib portion 18. The sixth rib portion 17 is connected to the fourth rib portion 142 at a bent portion 17a of the intermediate portion in the vehicle width direction. The sixth rib portion 17 is inclined downward from its end on the outer side of the vehicle body to the bent portion 17a and also inclined upward from the bent portion 17a to its end on the inner side of the vehicle body.

Since the fifth rib portion 16 and the sixth rib portion 17 are configured as mentioned above, the closed space 93 is formed so as to expand in the vertical direction at the intermediate part viewed from the vehicle width direction. The seventh rib portion 18 is adjacent to the inner structure 2. Therefore, the closed space 93 extends in the vehicle width direction from the end surface of the outer structure 1 on the outer side of the vehicle body to the other end surface thereof on the inner side of the vehicle body, while the other end surface of the outer structure 1 on the inner side of the vehicle body is adjacent to the inner structure 2.

With the above-mentioned configuration, the closed space 93 can be formed in the outer structure 1 so as to extend from the end surface of the outer structure 1 on the outer side of the vehicle body to the other end surface thereof on the inner side of the vehicle body that is adjacent to the inner structure 2, thereby making it possible to improve the shock absorption property of the outer structure 1. A bulk head, which is provided between the outer structure 1 and the inner structure 2, can be omitted, so that the skeleton of the vehicle structure can be simplified and its weight can be reduced.

In the above-mentioned embodiments and the modifications 1 and 2, two or more closed spaces are formed in the outer structure 1. However, even by forming one or more closed spaces, the shock absorption property of the outer structure 1 can be improved. It is noted that by forming two or more closed spaces on the outer side of the vehicle body, a partition wall is formed between the closed spaces, whereby the shock absorption property of the outer structure 1 can be further improved.

(Modification 3)

Figure 5:
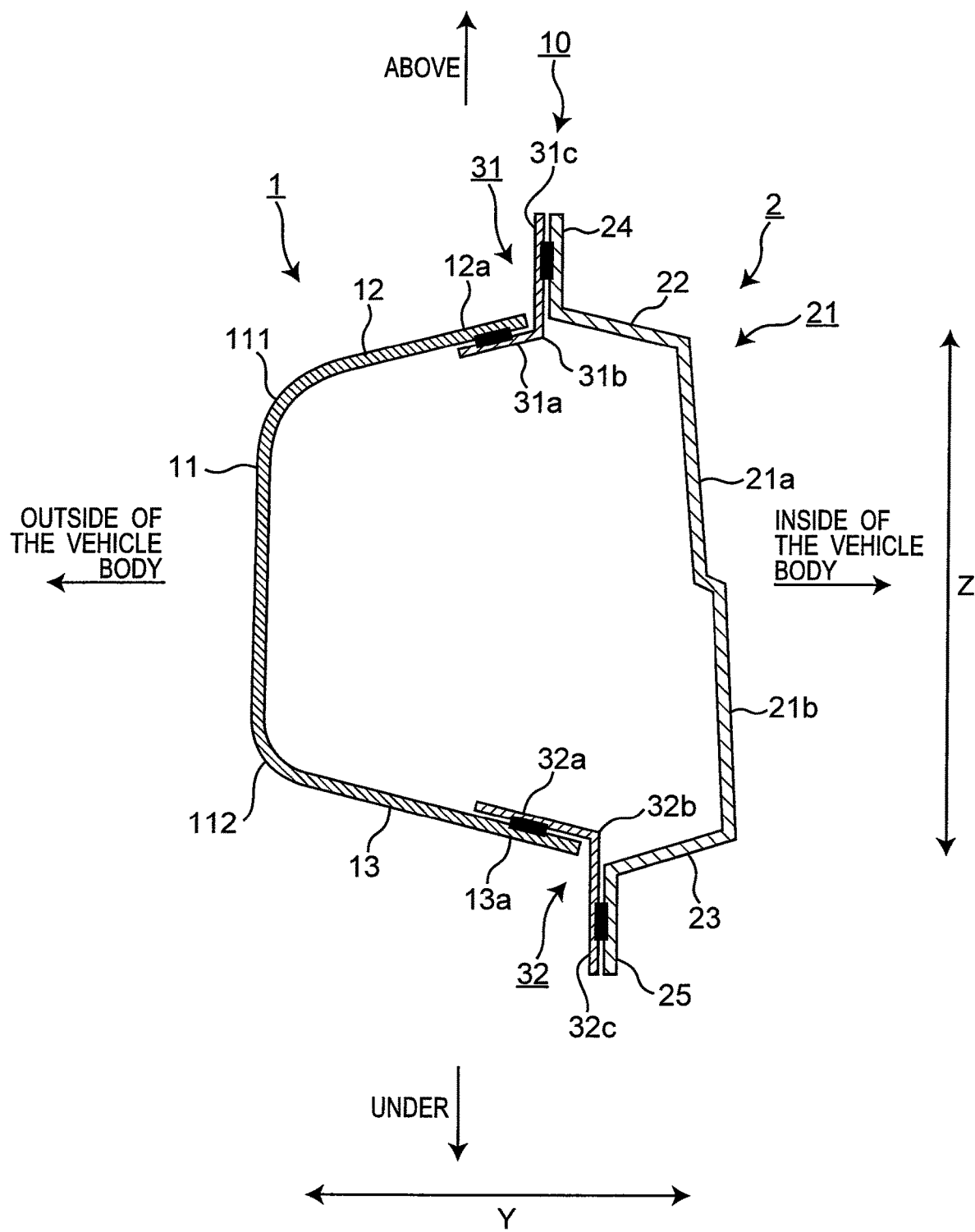
FIG. 5 is a vertical cross-sectional view in a case where an outer structure is formed of a plate material.

In the above-mentioned embodiments and the modifications 1 and 2, the outer structure 1 is formed of a hollow extruded material, but may be formed of a plate material. FIG. 5 is a vertical cross-sectional view in a case where the outer structure 1 is formed of a plate material.

As shown in FIG. 5, the outer structure 1 includes a top portion 11 protruding to the outer side of the vehicle body and extending substantially in the vertical direction, and a first wall portion 12 and a second wall portion 13 respectively extending from both end parts of the top portion 11 to the inner side of the vehicle body. The top portion 11, the first wall portion 12, and the second wall portion 13 are integrally formed by a plate material.

With the above-mentioned configuration, the outer structure 1 can be easily manufactured, and the skeleton of the outer structure 1 can be simplified.

In the above-mentioned embodiments, the vehicle structure 10 is applied to a locker (side sill) of an automobile. However, the vehicle structure 10 is not limited to a locker, and is widely applied to structures requiring the shock absorption property, such as a floor structure and a pillar.

In the above-mentioned embodiment, the vehicle structure 10 is described as an example of a structure for an automobile. However, the present invention is not limited to the structure for an automobile and can be applied to a structure for any vehicle.

In the above-mentioned embodiments, one side is the inner side of the vehicle body, and the other side is the outer side of the vehicle body. Alternatively, the one side may be the outer side of the vehicle body, and the other side may be the inner side of the vehicle body. The one side structure is the inner structure, and the another side structure is the outer structure. Alternatively, the one side structure may be the outer structure, and the another side structure may be the inner structure.

The present invention is not limited to the configurations described in the above-mentioned embodiments, and can include various modifications that can be conceived by a person skilled in the art without departing from the contents mentioned in claims.

The invention claimed is:

1. A structure for a vehicle, comprising:
one side structure made of steel and located on an outer side or an inner side of a vehicle body; and
another side structure located on an opposing side of the one side structure with respect to the outer side or the inner side of the vehicle body and joined to the one side structure, wherein
the another side structure comprises:
a top portion made of an aluminum alloy and protruding toward the opposing side;
wall portions respectively extending from both end parts of the top portion to the outer side or the inner side, each of the wall portions being made of an aluminum alloy; and
a tab portion attached to an end part of the wall portion, extending toward an outside of the another side structure, and joined to the one side structure, the tab portion being made of steel
wherein a first concave portion is recessed toward an inside of the another side structure and is formed in an end part of the wall portion, and
wherein the tab portion is attached to the first concave portion.

2. The structure for a vehicle according to claim 1, wherein the tab portion has one end part thereof attached to the end part of the wall portion, the tab portion extending from the one end part to a bent portion thereof toward the outer side or the inner side and then being bent at the bent portion toward the outside of the another side structure to lead to another end part thereof.

3. The structure for a vehicle according to claim 1, wherein
in a cross section perpendicular to a longitudinal direction of the another side structure,
one or more closed spaces are formed in at least a part on the opposing side of the another side structure.

4. The structure for a vehicle according to claim 3, wherein at least one of the one or more closed spaces extends toward the outer side or the inner side, and an end surface of the at least one of the one or more closed spaces on the outer side or the inner side is adjacent to the one side structure.

5. The structure for a vehicle according to claim 1, wherein
the tab portion is made of a high-strength steel plate, and
a tensile strength of the high-strength steel plate is 590 MPa or more.

6. The structure for a vehicle according to claim 1, wherein
the tab portion has one end part thereof attached to the end part of the wall portion, the tab portion extending from the one end part to a bent portion thereof toward the outer side or the inner side and then being bent at the bent portion toward the outside of the another side structure to lead to another end part thereof, and
a second concave portion is formed in an end part of the wall portion, the second concave portion surrounding the bent portion of the tab portion.

7. The structure for a vehicle according to claim 1, wherein
each of the top portion and the wall portion is made of an extruded material of the aluminum alloy, and
a thickness of at least a part of the top portion and the wall portion is greater than a thickness of each of other parts thereof.

* * * * *